(12) United States Patent
Oya

(10) Patent No.: US 11,772,550 B2
(45) Date of Patent: Oct. 3, 2023

(54) DISPLAY SYSTEM OF VEHICLE

(71) Applicant: TOYOTA JIDOSHA KABUSHIKI KAISHA, Aichi-ken (JP)

(72) Inventor: Kentaro Oya, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/752,858

(22) Filed: May 25, 2022

(65) Prior Publication Data

US 2022/0410796 A1     Dec. 29, 2022

(30) Foreign Application Priority Data

Jun. 29, 2021   (JP) .................................. 2021-107205

(51) Int. Cl.
*B60Q 1/50*      (2006.01)
*B60R 1/27*      (2022.01)

(52) U.S. Cl.
CPC ........... *B60Q 1/5037* (2022.05); *B60Q 1/525* (2013.01); *B60R 1/27* (2022.01); *B60Q 2800/30* (2022.05); *B60R 2300/202* (2013.01); *B60R 2300/607* (2013.01); *B60R 2300/802* (2013.01); *B60R 2300/8033* (2013.01)

(58) Field of Classification Search
CPC .. B60Q 1/5037; B60Q 1/525; B60Q 2800/30; B60R 1/27; B60R 2300/202; B60R 2300/607; B60R 2300/802
See application file for complete search history.

(56) References Cited

U.S. PATENT DOCUMENTS

| | | | |
|---|---|---|---|
| 5,373,482 A * | 12/1994 | Gauthier | B60Q 9/007 367/13 |
| 6,642,839 B1 * | 11/2003 | Gunderson | G01S 13/931 340/904 |
| 7,061,372 B2 * | 6/2006 | Gunderson | G01S 13/862 340/904 |
| 7,876,203 B2 * | 1/2011 | Traylor | G08G 1/165 340/436 |
| 8,606,430 B2 * | 12/2013 | Seder | G09F 21/04 701/2 |
| 10,261,513 B2 * | 4/2019 | Reiley | G05D 1/0061 |
| 11,079,765 B2 * | 8/2021 | Reiley | B60Q 1/507 |
| 2002/0097146 A1 * | 7/2002 | Harris, III | B60Q 9/008 340/901 |
| 2002/0112026 A1 * | 8/2002 | Fridman | B60Q 1/2611 455/99 |

(Continued)

FOREIGN PATENT DOCUMENTS

JP       H6-298023 A       10/1994
JP       H10-989 A          1/1998

(Continued)

*Primary Examiner* — Hoi C Lau
(74) *Attorney, Agent, or Firm* — HAUPTMAN HAM, LLP

(57) ABSTRACT

A display system of a vehicle includes a person detection device that detects a person on one side of the vehicle in a top view of the vehicle, a display device provided on the vehicle exterior on the side opposite to the one side of the vehicle, and a controller that controls the display device. When the person detection device detects a person, the controller controls the display device to display a warning indicating presence of the person, on a display of the display device.

8 Claims, 13 Drawing Sheets

(56) References Cited

U.S. PATENT DOCUMENTS

| | | | | |
|---|---|---|---|---|
| 2003/0141965 A1* | 7/2003 | Gunderson | ............ | B60Q 9/008 |
| | | | | 348/148 |
| 2004/0155759 A1* | 8/2004 | Gunderson | ........... | G01S 13/862 |
| | | | | 340/435 |
| 2012/0056738 A1* | 3/2012 | Lynam | ................... | B60R 1/0602 |
| | | | | 340/468 |
| 2012/0089273 A1* | 4/2012 | Seder | .................... | G09F 21/049 |
| | | | | 701/2 |
| 2013/0263512 A1* | 10/2013 | Hus | .......................... | G09F 9/30 |
| | | | | 49/70 |
| 2013/0278402 A1* | 10/2013 | Rothschild | ............. | B60Q 1/543 |
| | | | | 340/425.5 |
| 2018/0173237 A1* | 6/2018 | Reiley | ...................... | B60Q 1/46 |
| 2019/0196482 A1* | 6/2019 | Reiley | ...................... | B60Q 1/46 |
| 2021/0287546 A1* | 9/2021 | Englander | ............. | B60Q 5/006 |
| 2022/0013045 A1* | 1/2022 | Takeda | .............. | B60W 60/0017 |
| 2022/0097524 A1* | 3/2022 | Choi | .................... | B60K 37/02 |
| 2022/0410796 A1* | 12/2022 | Oya | .................... | B60Q 1/5037 |
| 2023/0120392 A1* | 4/2023 | Miyazawa | ............ | G08G 1/005 |
| | | | | 340/468 |

FOREIGN PATENT DOCUMENTS

| | | |
|---|---|---|
| JP | 2007-233864 A | 9/2007 |
| JP | 2008-62673 A | 3/2008 |

\* cited by examiner

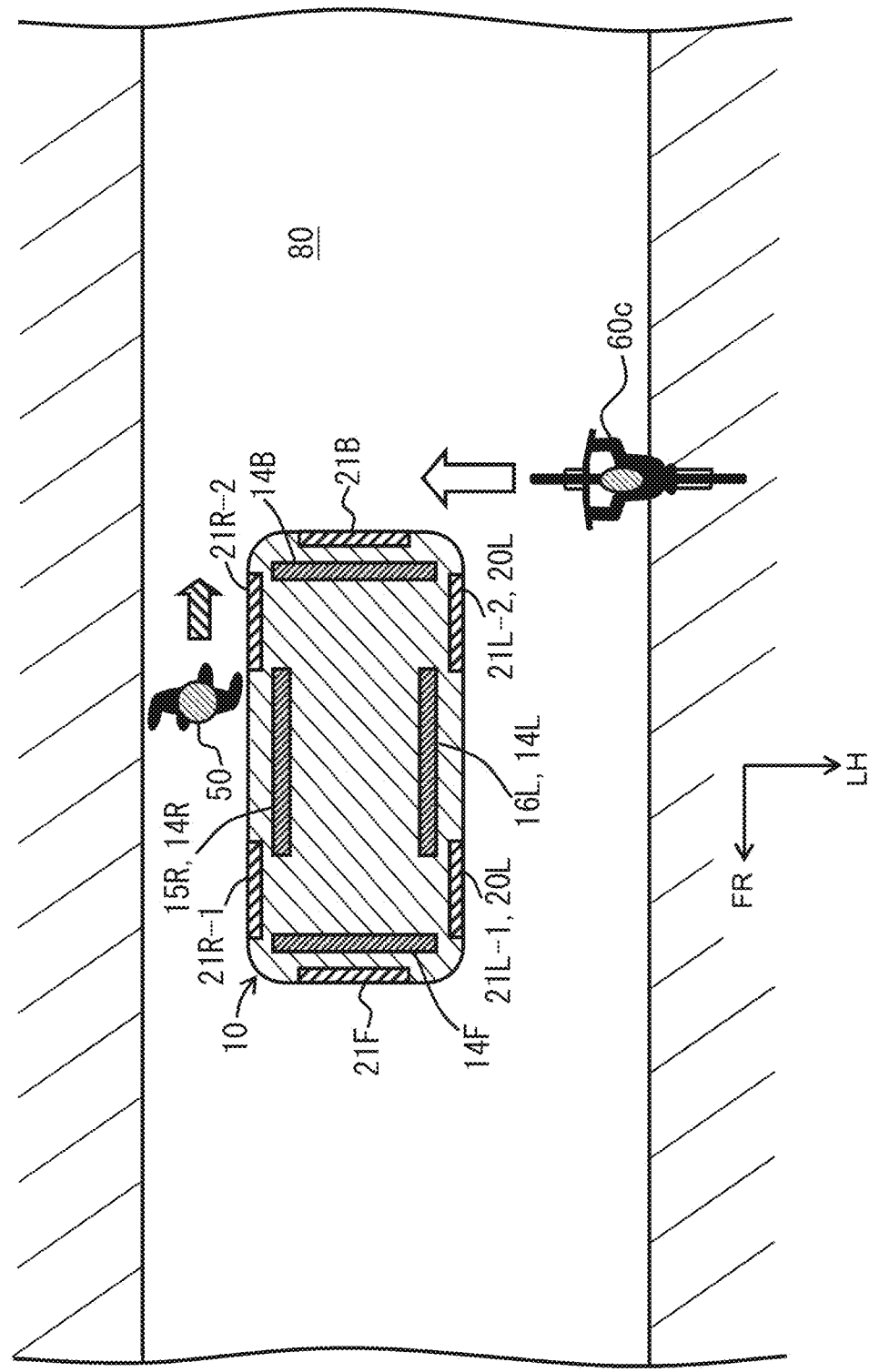

DISPLAY SYSTEM OF VEHICLE

CROSS-REFERENCE TO RELATED APPLICATION

This application claims priority to Japanese Patent Application No. 2021-107205 filed on Jun. 29, 2021, incorporated herein by reference in its entirety.

BACKGROUND

1. Technical Field

The disclosure relates to a display system of a vehicle, and particularly to a display system of a vehicle having a display device that imparts information to the outside of the vehicle.

2. Description of Related Art

Conventionally, there has been a problem that a driver of an automobile or other vehicle traveling behind a large-size vehicle cannot check a condition (such as a signal status) in front of the large-size vehicle because the driver's view is blocked by the large-size vehicle. In the light of the problem, Japanese Unexamined Patent Application Publication No. 10-989 (JP 10-989 A) discloses a system for providing information on road conditions in front of a large-size vehicle, to a vehicle traveling behind the large-size vehicle, by installing a camera in the front part of the large-size vehicle, installing a display unit in the rear part of the large-size vehicle, and displaying the road conditions in front of the vehicle captured by the camera on the display unit in the rear part of the vehicle.

SUMMARY

It is difficult to visually recognize a person who is present on one side of a vehicle (which will be referred to as "self-vehicle") in a top view of the vehicle, from a moving object (such as an automobile) on the side opposite to the one side of the self-vehicle, because the self-vehicle blocks the view. For example, while the self-vehicle is stopped, it is difficult to visually recognize the presence of a person walking in front of the self-vehicle, from a rear vehicle on the rear side of the self-vehicle, because the self-vehicle blocks the view. Thus, if the rear vehicle passes by the stopped self-vehicle and moves forward of the self-vehicle, without noticing the presence of the person walking in front of the self-vehicle, and if the person walking in front of the self-vehicle heads toward the road which the rear vehicle is about to pass, the rear vehicle and the person may get close to each other.

Accordingly, it is desired to make the presence of the person on one side of the vehicle in the top view of the vehicle noticeable by the moving object on the side opposite to the one side of the vehicle.

A display system of a vehicle according to one aspect of the disclosure includes a person detection device configured to detect a person on a first side of the vehicle in a top view of the vehicle, a display device provided on a vehicle exterior on a second side opposite to the first side of the vehicle, and a controller configured to control the display device. When the person detection device detects the person, the controller is configured to control the display device to display a warning indicating presence of the person, on a display of the display device.

The display system described above may further include a moving object detection device configured to detect a moving object on the second side of the vehicle. The controller may be configured to control the display device to display the warning indicating the presence of the person, on the display of the display device, only when the moving object detection device detects the moving object, and the person detection device detects the person.

In the display system described above, the person detection device may be a front side person detection device configured to detect a person on a front side of the vehicle, and the display device may be a rear side display device provided on the vehicle exterior on a rear side of the vehicle. The controller may be configured to control the rear side display device to display a warning indicating that there is a person on the front side of the vehicle, on a display of the rear side display device, when the front side person detection device detects the person on the front side of the vehicle.

In the display system described above, the person detection device may be a rear side person detection device configured to detect a person on a rear side of the vehicle, and the display device may be a front side display device provided on the vehicle exterior on a front side of the vehicle. The controller may be configured to control the front side display device to display a warning indicating that there is a person on the rear side of the vehicle, on a display of the front side display device, when the rear side person detection device detects the person on the rear side of the vehicle.

In the display system described above, the person detection device may be a left side person detection device configured to detect a person on a left side of the vehicle, and the display device may be a right side display device provided on the vehicle exterior on a right side of the vehicle. The controller may be configured to control the right side display device to display a warning indicating that there is a person on the left side of the vehicle, on a display of the right side display device, when the left side person detection device detects the person on the left side of the vehicle.

In the display system described above, the person detection device may be a right side person detection device configured to detect a person on a right side of the vehicle, and the display device may be a left side display device provided on the vehicle exterior on a left side of the vehicle. The controller may be configured to control the left side display device to display a warning indicating that there is a person on the right side of the vehicle, on a display of the left side display device, when the right side person detection device detects the person on the right side of the vehicle.

According to the disclosure, when a person is detected on one side of the vehicle in the top view of the vehicle, a warning is displayed on the display of the display device provided on the vehicle exterior on the side opposite to the one side of the vehicle, so that the presence of the person can be noticed by the moving object located on the side of the vehicle opposite to the side where the person is present.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 13 is a view useful for describing a situation where warnings are displayed on displays of the left side display device.

DETAILED DESCRIPTION OF EMBODIMENTS

One embodiment of the disclosure will be described with reference to the drawings. The configuration described below is a mere example for illustrative purposes only, and can be changed as needed according to the specifications, etc. of the vehicle. In all of the drawings, the same reference signs are assigned to the same elements, which will not be repeatedly described. In the following description, the terms indicating directions such as front, rear, right, left, up, down, etc. refer to directions related to the vehicle, unless otherwise noted. In each of the drawings, the direction of arrow FR represents forward, the direction of arrow UP represents upward, and the direction of arrow LH represents leftward.

Figure 1:
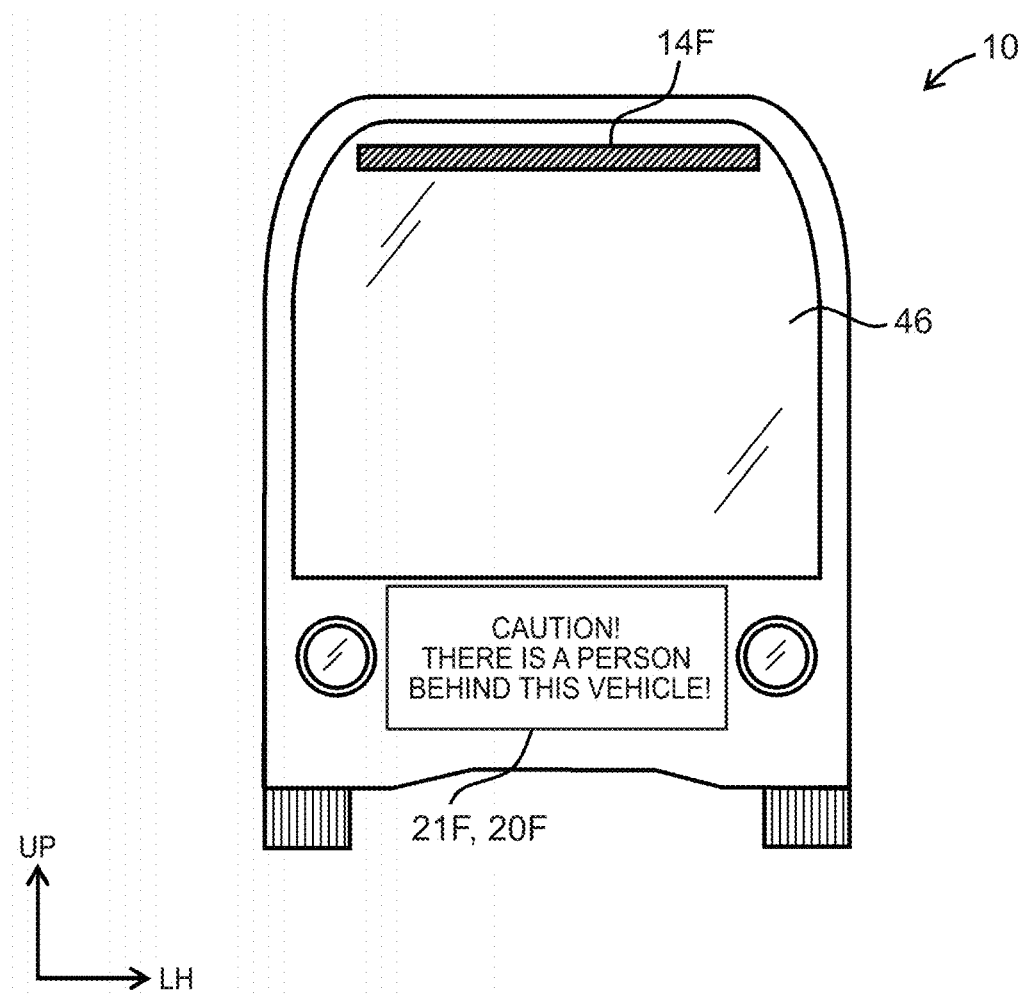
FIG. 1 is a front view of a vehicle according to one embodiment, showing a state where a warning is displayed on a display at the front of the vehicle.
Figure 2:
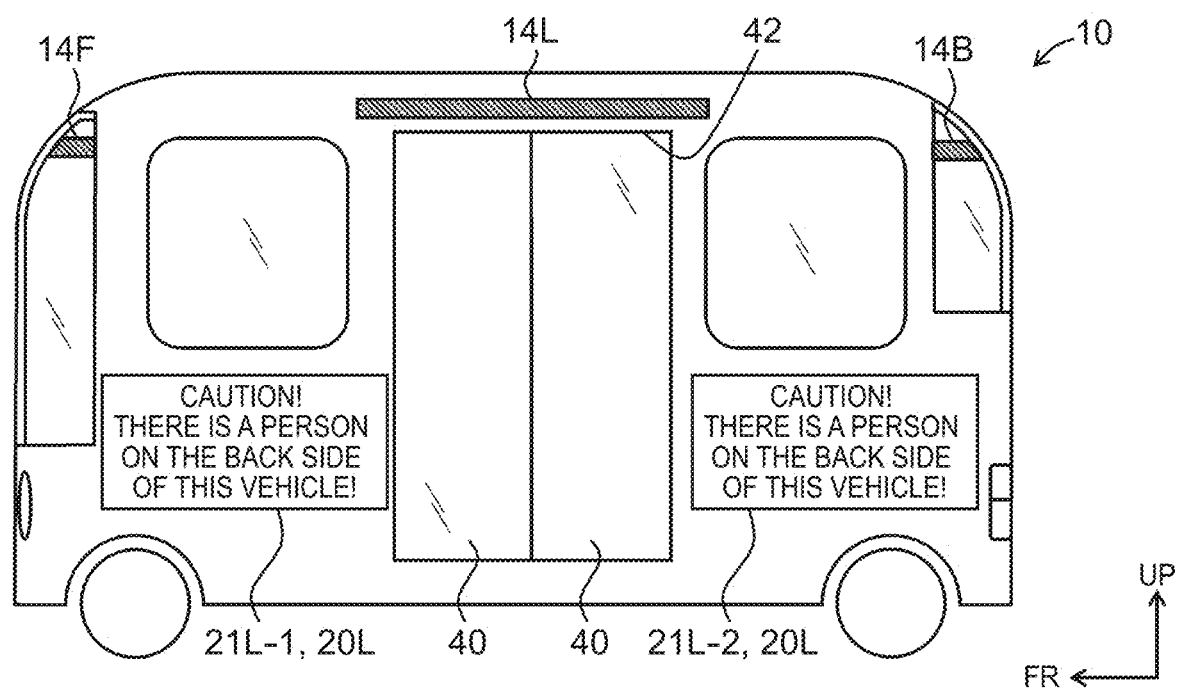
FIG. 2 is a left side view of the vehicle according to the embodiment, showing a state where warnings are displayed on displays at the left side of the vehicle.
Figure 3:
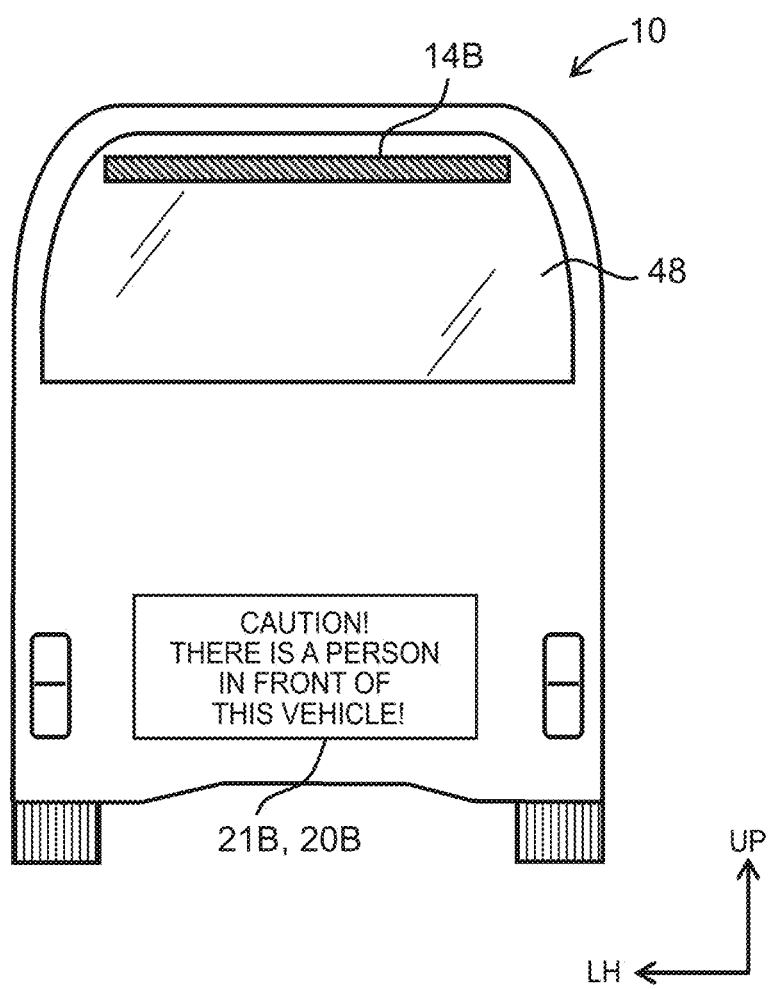
FIG. 3 is a rear view of the vehicle according to the embodiment, showing a state where a warning is displayed on a display at the rear of the vehicle.
Figure 4:
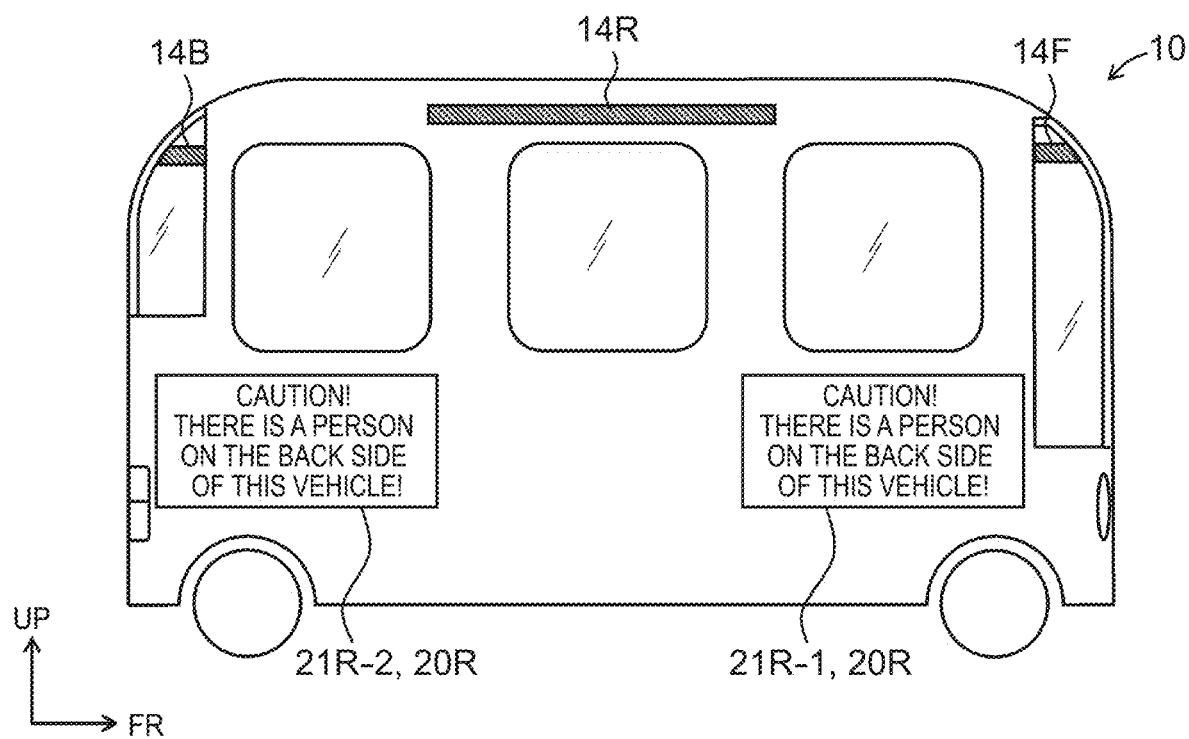
FIG. 4 is a right side view of the vehicle according to the embodiment, showing a state where warnings are displayed on displays at the right side of the vehicle.

FIG. 1 is a front view of a vehicle 10 according to the embodiment, FIG. 2 is a left side view of the vehicle 10, FIG. 3 is a rear view of the vehicle 10, and FIG. 4 is a right side view of the vehicle 10. Displays 21F, 21L-1, 21L-2, 21B, 21R-1, 21R-2 are provided on the exterior of the vehicle, and FIG. 1 to FIG. 4 show the states where warnings are displayed on the respective displays 21F, 21L-1, 21L-2, 21B, 21R-1, 21R-2. The warnings are displayed when particular conditions as described below are satisfied, and are not displayed when the conditions are not satisfied.

The vehicle 10 is a generally rectangular electrified vehicle that can be driven automatically. More specifically, the vehicle 10 can be driven in two or more driving modes including an automatic driving mode and a manual driving mode. While the vehicle 10 is a battery electric vehicle using a motor as a driving source in this embodiment, the vehicle 10 may be an automobile using an internal combustion engine as a driving source, or a hybrid electric vehicle using both the motor and the internal combustion engine as driving sources, in other embodiments.

The vehicle 10 is used as a bus on which an unspecified number of passengers can ride. However, the type of use of the vehicle 10 can be changed as needed. For example, the vehicle 10 may be used as a shop such as a retail store where various goods are displayed and sold, or a restaurant where food and drink are prepared and served. The vehicle 10 may also be used as an office where office work, meetings with customers, etc. are conducted. The vehicle 10 may also be used as a taxicab, transportation vehicle, etc. for transporting customers or cargo. The vehicle 10 may be used not only for business, but also for personal transportation.

The height of the vehicle 10 is greater than the height of an average person. Thus, it is impossible or difficult to visually recognize a person on one side (e.g., the front side) of the vehicle 10 in a top view of the vehicle 10, from the side (e.g., the rear side) opposite to the one side of the vehicle 10.

As shown in FIG. 2, a passenger entrance 42 is provided on the left side of the vehicle 10. The passenger entrance 42 is located at substantially the middle of the vehicle as viewed in the longitudinal direction, and is closed by doors 40 during traveling of the vehicle. The doors 40 are sliding doors, and the front side door 40 moves forward, while the rear side door 40 moves rearward, so that the passenger entrance 42 is opened.

As shown in FIG. 1, a front side detection device 14F is installed in an upper part of the vehicle body on the cabin side of a windshield 46. The front side detection device 14F functions as a front side person detection device 15F (see FIG. 5) that detects a person on the front side of the vehicle 10, and also functions as a front side moving object detection device 16F that detects a moving object (such as an automobile, motorcycle, or bicycle) on the front side of the vehicle 10.

As shown in FIG. 3, a rear side detection device 14B is installed in an upper part of the vehicle body on the cabin side of a rear glass 48. The rear side detection device 14B functions as a rear side person detection device 15B (see FIG. 5) that detects a person on the rear side of the vehicle 10, and also functions as a rear side moving object detection device 16B that detects a moving object on the rear side of the vehicle 10.

As shown in FIG. 2, a left side detection device 14L is installed in an upper part of the left side of the vehicle 10. The left side detection device 14L functions as a left side person detection device 15L (see FIG. 5) that detects a person on the left-hand side of the vehicle 10, and also functions as a left side moving object detection device 16L that detects a moving object on the left-hand side of the vehicle 10.

As shown in FIG. 4, a right side detection device 14R is installed in an upper part of the right side of the vehicle 10. The right side detection device 14R functions as a right side person detection device 15R (see FIG. 5) that detects a person on the right-hand side of the vehicle 10, and also functions as a right side moving object detection device 16R that detects a moving object on the right-hand side of the vehicle 10.

In the following description, the front side detection device 14F, rear side detection device 14B, left side detection device 14L, and right side detection device 14R will also be simply referred to as "detection devices 14F, 14B, 14L, 14R". Also, in the following description, the front side person detection device 15F, rear side person detection device 15B, left side person detection device 15L, and right side person detection device 15R will also be simply referred to as "person detection devices 15F, 15B, 15L,

15R". Also, in the following description, the front side moving object detection device 16F, rear side moving object detection device 16B, left side moving object detection device 16L, and right side moving object detection device 16R will also be simply referred to as "moving object detection devices 16F, 16B, 16L, 16R".

Each of the detection devices 14F, 14B, 14L, 14R includes one, or two or more, of a camera (including a stereo camera), Lidar, millimeter-wave radar, ultrasonic sensor, etc. The sensors of the detection devices 14F, 14B, 14L, 14R are not limited to the sensors listed herein.

In one form, the detection device 14F that functions as the person detection device 15F includes a camera, and detects a person on the front side of the vehicle 10, by checking an image of the vehicle front side captured by the camera, against pre-prepared pattern images of people. In another form, the detection device 14F that functions as the person detection device 15F includes a Lidar, and may recognize that there is a person on the front side of the vehicle 10 when the Lidar detects an object that traverse the front side of the vehicle at a relatively low speed. The remaining detection devices 14B, 14L, 14R (person detection devices 15B, 15L, 15R) are similar to the detection device 14F (person detection device 15F).

In one form, the detection device 14F that functions as the moving object detection device 16F includes a camera, and detects a moving object on the front side of the vehicle 10, by checking an image of the vehicle front side captured by the camera, against pre-prepared pattern images of moving objects (such as automobiles, motorcycles, and bicycles). In another form, the detection device 14F that functions as the moving object detection device 16F includes a Lidar, and may recognize that there is a moving object on the front side of the vehicle 10 when the Lidar detects an object approaching toward the vehicle 10. The remaining detection devices 14B, 14L, 14R (moving object detection devices 16B, 16L, 16R) are similar to the detection device 14F (moving object detection device 16F).

As shown in FIG. 1, a front side display device 20F is installed on a lower part of the front face of the vehicle 10. The front side display device 20F includes a display 21F that imparts information to the front of the vehicle. Also, as shown in FIG. 3, a rear side display device 20B is installed on a lower part of the rear face of the vehicle 10. The rear side display device 20B includes a display 21B that imparts information to the rear of the vehicle.

As shown in FIG. 2, a left side display device 20L is installed on the left side face of the vehicle 10. The left side display device 20L includes displays 21L-1, 21L-2 that impart information to the left of the vehicle. The display 21L-1 is located in an anterior part of the vehicle, and the display 21L-2 is located in a posterior part of the vehicle. In the following description, the display 21L-1 will also be referred to as "anterior display 21L-1", and the display 21L-2 will also be referred to as "posterior display 21L-2".

As shown in FIG. 4, a right side display device 20R is installed on the right side face of the vehicle 10. The right side display device 20R includes displays 21R-1, 21R-2 that impart information to the right of the vehicle. The display 21R-1 is located in an anterior part of the vehicle, and the display 21R-2 is located in a posterior part of the vehicle. In the following description, the display 21R-1 will also be referred to as "anterior display 21R-1", and the display 21R-2 will also be referred to as "posterior display 21R-2".

In the following description, the front side display device 20F, rear side display device 20B, left side display device 20L, and right side display device 20R will also be simply referred to as "display devices 20F, 20B, 20L, 20R".

The displays 21F, 21B, 21L-1, 21L-2, 21R-1, 21R-2 of the display devices 20F, 20B, 20L, 20R are, for example, liquid crystal displays, organic EL (electroluminescent) displays, LED (light-emitting diode) displays, etc. The LED display consists of a multiplicity of LED devices arranged vertically and horizontally, and expresses letters, symbols, etc. by selectively turning on a plurality of LED devices. The type of each display of the display devices 20F, 20B, 20L, 20R is not limited to those listed herein.

Figure 5:
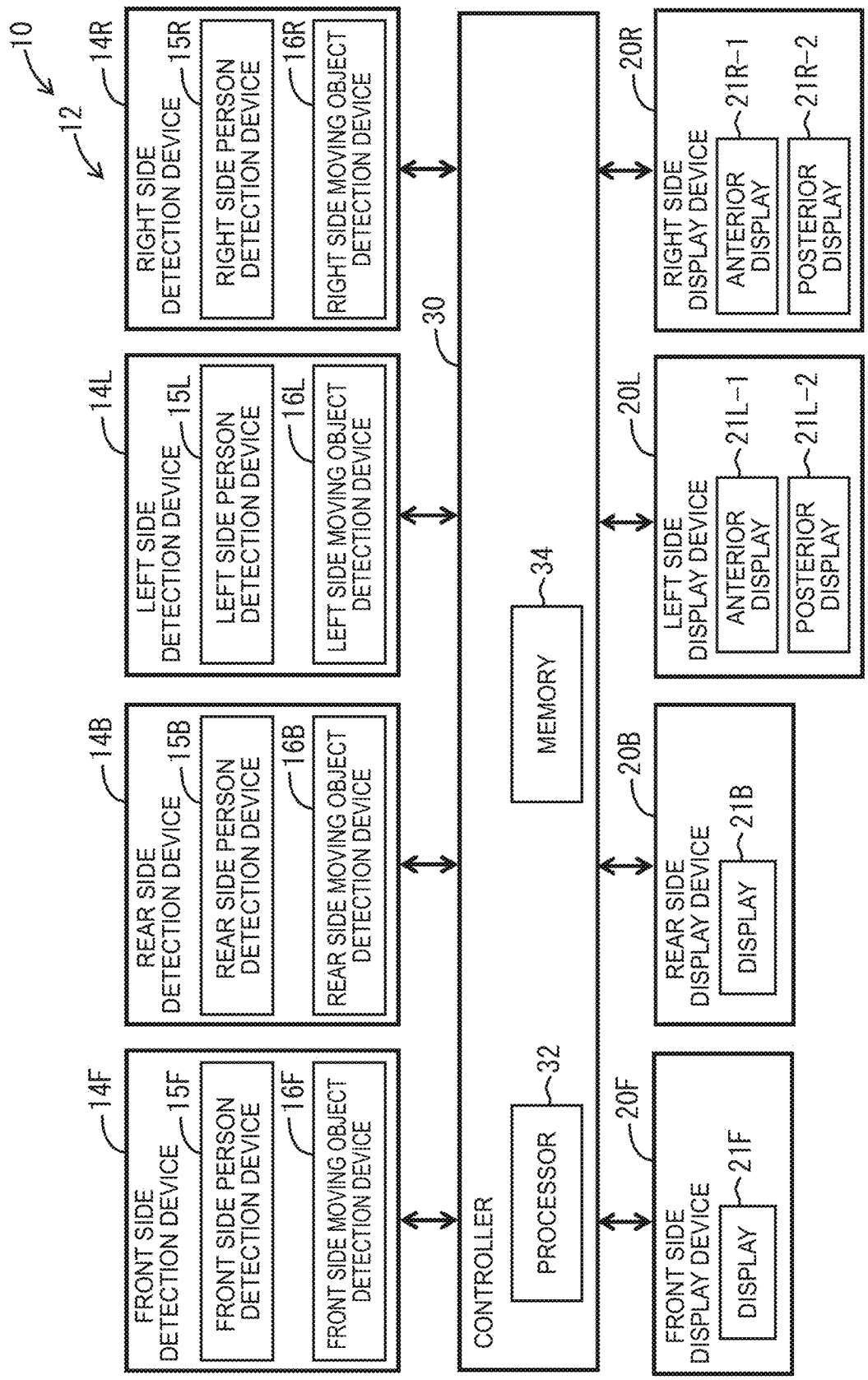
FIG. 5 is a functional block diagram of a display system of the vehicle.

FIG. 5 is a functional block diagram of a display system 12 installed in the vehicle 10. The display system 12 includes the front side detection device 14F, rear side detection device 14B, left side detection device 14L, right side detection device 14R, front side display device 20F, rear side display device 20B, left side display device 20L, right side display device 20R, and a controller 30.

As described above, the front side detection device 14F functions as the front side person detection device 15F and the front side moving object detection device 16F, and the rear side detection device 14B functions as the rear side person detection device 15B and the rear side moving object detection device 16B. The left side detection device 14L functions as the left side person detection device 15L and the left side moving object detection device 16L, and the right side detection device 14R functions as the right side person detection device 15R and the right side moving object detection device 16R.

The controller 30 includes a processor 32 having a central processing unit (CPU), and a memory 34 that stores control programs, control data, etc. The memory 34 is, for example, a random access memory (RAM), read-only memory (ROM), flash memory, etc. The processor 32 operates according to a control program stored in the memory 34, so as to control the display devices 20F, 20B, 20L, 20R. The processor 32 may include an application specific integrated circuit (ASIC), etc. in place of or in addition to the CPU.

The detection devices 14F, 14B, 14L, 14R and the display devices 20F, 20B, 20L, 20R are electrically connected to the controller 30.

Figure 6:
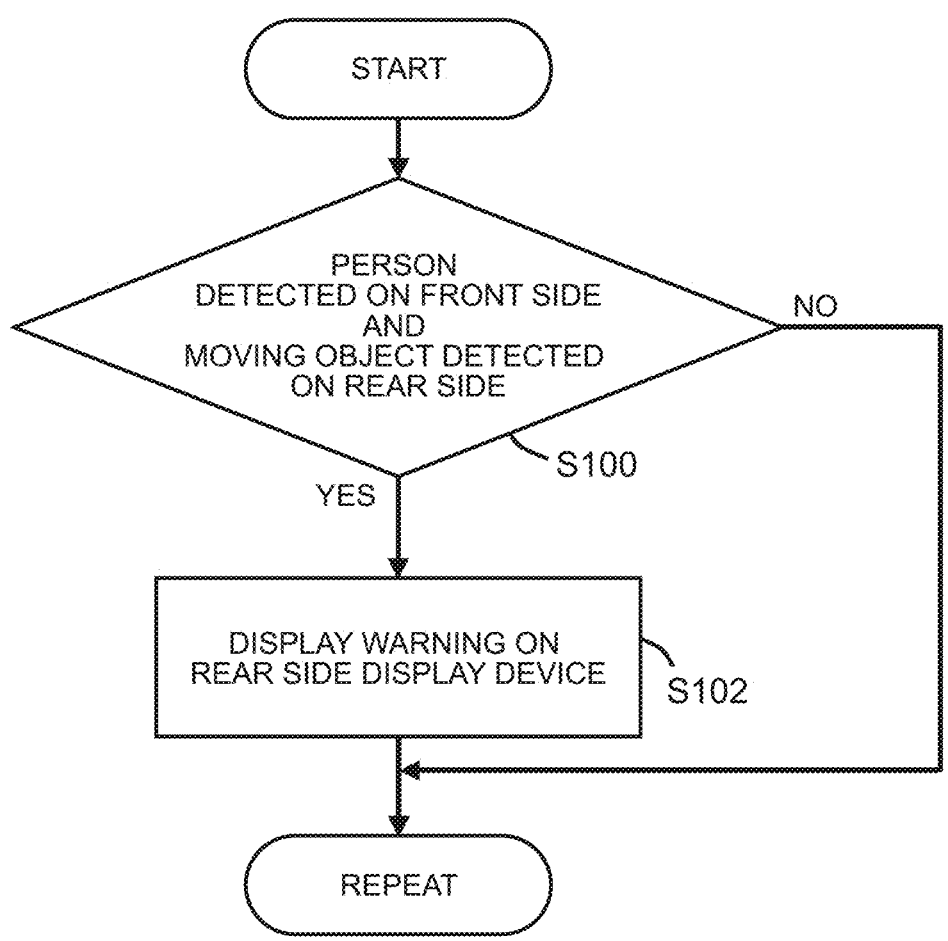
FIG. 6 is a flowchart showing control of a rear side display device by a controller.
Figure 7:
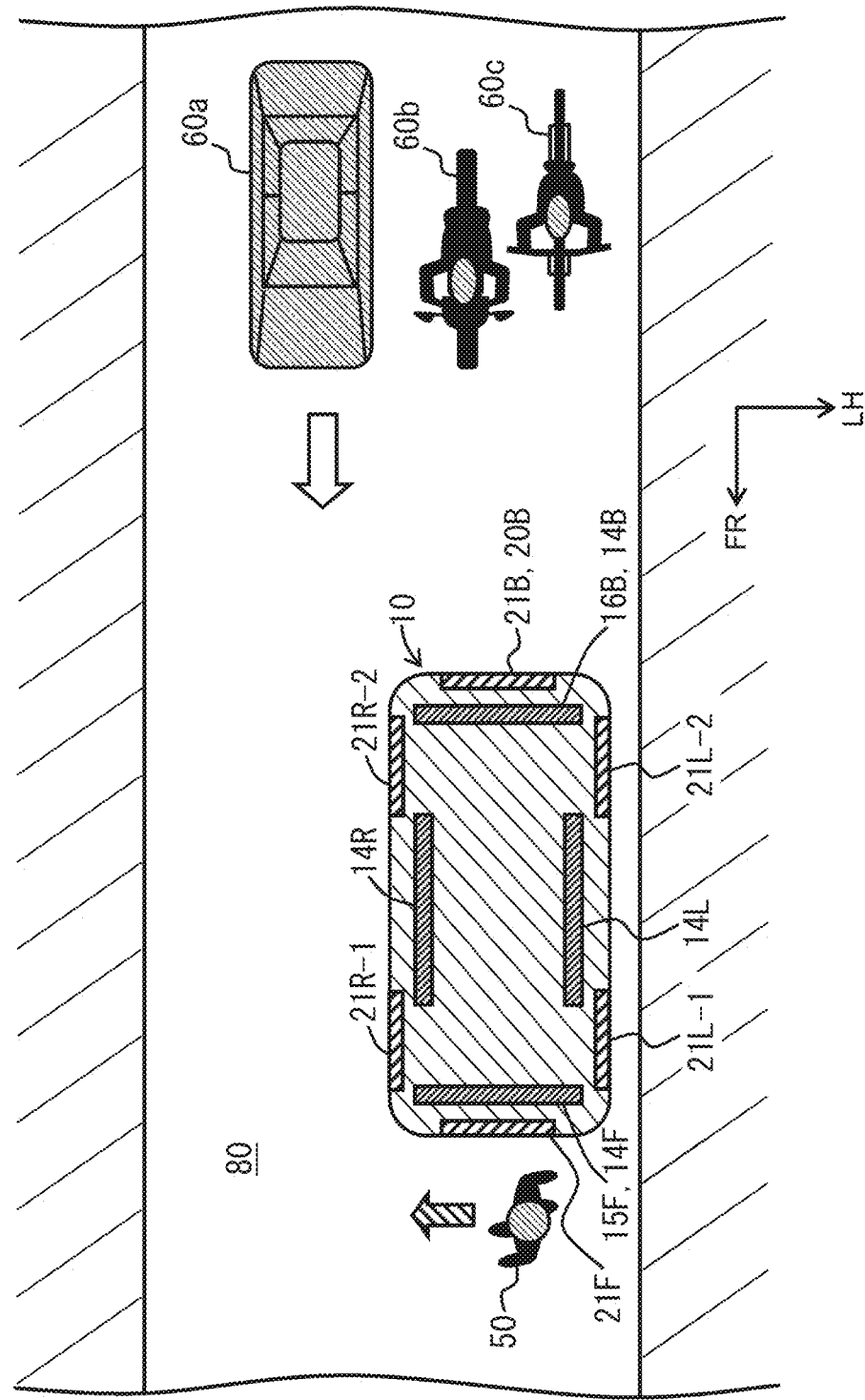
FIG. 7 is a view useful for describing a situation where a warning is displayed on a display of the rear side display device.

Next, the operation of the display system 12 will be described. FIG. 6 is a flowchart showing control of the rear side display device 20B by the controller 30. FIG. 7 is a view useful for describing a situation where a warning is displayed on the display 21B of the rear side display device 20B. In FIG. 7, a state of the vehicle 10 as viewed from above is illustrated.

The controller 30 repeatedly executes a control routine of FIG. 6 in predetermined cycles. Initially, in step S100, the controller 30 receives information as to whether there is a person 50 on the front side of the vehicle 10, from the front side detection device 14F (the front side person detection device 15F), and receives information as to whether there is a moving object 60a (60b, 60c) on the rear side of the vehicle 10, from the rear side detection device 14B (the rear side moving object detection device 16B). Then, the controller 30 proceeds to step S102 when there is a person 50 on the front side of the vehicle 10, and there is a moving object 60a (60b, 60c) on the rear side of the vehicle 10 (S100: YES). On the other hand, the controller 30 finishes this cycle of processing when there is no person 50 on the front side of the vehicle 10 or when there is no moving object 60a (60b, 60C) on the rear side of the vehicle 10 (S100: NO).

FIG. 7 shows a state where an affirmative decision (YES) is obtained in step S100 of FIG. 6. In FIG. 7, the vehicle 10 is stopped on a road 80, and there is a person 50 on the front side of the vehicle 10, while there are an automobile 60*a*, motorcycle 60*b*, and bicycle 60*c* as moving objects on the rear side of the vehicle 10.

In step S102 of FIG. 6, the controller 30 controls the rear side display device 20B so that a warning indicating that there is a person 50 on the front side of the vehicle 10 is displayed on the display 21B of the rear side display device 20B. FIG. 3 shows a state where the warning is displayed on the display 21B of the rear side display device 20B. Since the warning is displayed on the rear face of the vehicle 10, the moving objects 60*a*, 60*b*, 60*c* on the rear side of the vehicle 10 can recognize that there is a person 50 on the front side of the vehicle 10. Thus, the moving objects 60*a* (60*b*, 60*c*) on the rear side of the vehicle 10 can be prevented from getting close to the person 50 (see FIG. 7) walking in front of the vehicle 10 to cross the road 80, for example.

In the embodiment described above, the controller 30 causes the display 21B of the rear side display device 20B to display the warning when there is a person 50 on the front side of the vehicle 10, and there is a moving object 60*a* (60*b*, 60*c*) on the rear side of the vehicle 10. However, when there is a person 50 on the front side of the vehicle 10, the controller 30 may cause the display 21B of the rear side display device 20B to display the warning, irrespective of whether there is a moving object 60*a* (60*b*, 60*c*) on the rear side of the vehicle 10. Namely, the controller 30 may control the warning on the display 21B of the rear side display device 20B, based only on the information from the front side detection device 14F (the front side person detection device 15F), without receiving information from the rear side detection device 14B (the rear side moving object detection device 16B).

The warning on the display 21B shown in FIG. 3 is a mere example, and may be changed in various ways. For example, symbols, marks, pictures, or the like, may be displayed on the display 21B as a part or the whole of the warning, or the letters, etc. of the warning may blink at predetermined time intervals, or the color may change. This also applies to warnings on the displays 21F, 21L-1, 21L-2, 21R-1, 21R-2 shown in FIGS. 1, 2, and 4, which will be described below.

Figure 8:
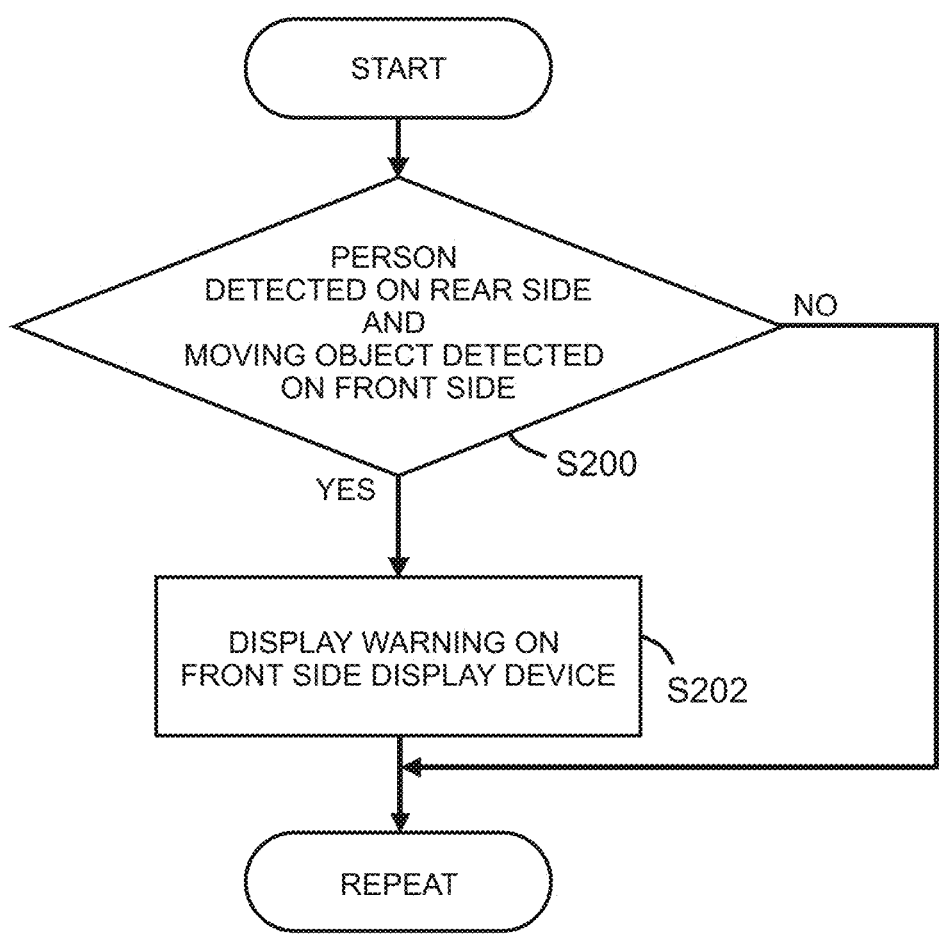
FIG. 8 is a flowchart showing control of a front side display device by the controller.
Figure 9:
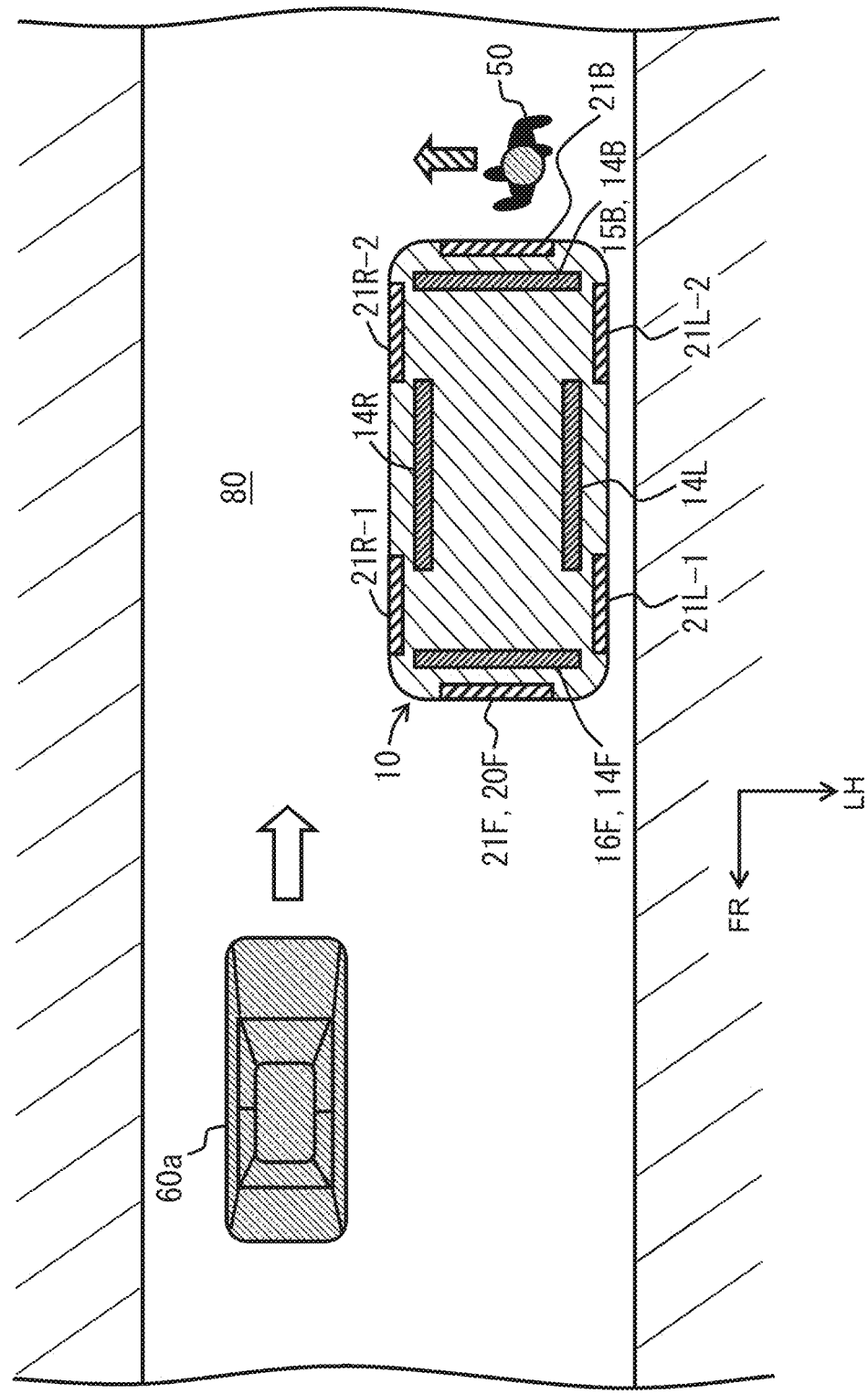
FIG. 9 is a view useful for describing a situation where a warning is displayed on a display of the front side display device.

Next, the control of the front side display device 20F will be described. FIG. 8 is a flowchart showing control of the front side display device 20F by the controller 30. FIG. 9 is a view useful for describing a situation where a warning is displayed on the display 21F of the front side display device 20F. In FIG. 9, a state of the vehicle 10 as viewed from above is illustrated.

The controller 30 repeatedly executes a control routine of FIG. 8 in predetermined cycles. Initially, in step S200, the controller 30 receives information as to whether there is a person 50 on the rear side of the vehicle 10, from the rear side detection device 14B (the rear side person detection device 15B), and receives information as to whether there is a moving object 60*a* on the front side of the vehicle 10, from the front side detection device 14F (the front side moving object detection device 16F). Then, the controller 30 proceeds to step S202 when there is a person 50 on the rear side of the vehicle 10, and there is a moving object 60*a* on the front side of the vehicle 10 (S200: YES). On the other hand, when there is no person 50 on the rear side of the vehicle 10, or there is no moving object 60*a* on the front side of the vehicle 10 (step S200: NO), the controller 30 finishes this cycle of processing.

FIG. 9 shows a state where an affirmative decision (YES) is obtained in step S200 of FIG. 7. In FIG. 7, the vehicle 10 is stopped on the road 80, and there is a person 50 on the rear side of the vehicle 10, while there is an automobile 60*a* as a moving object on the front side of the vehicle 10.

In step S202 of FIG. 7, the controller 30 controls the front side display device 20F so that a warning indicating that there is a person 50 on the rear side of the vehicle 10 is displayed on the display 21F of the front side display device 20F. FIG. 1 shows a state where the warning is displayed on the display 21F of the front side display device 20F. Since the warning is displayed on the front face of the vehicle 10, the moving object 60*a* on the front side of the vehicle 10 can recognize that there is a person 50 on the rear side of the vehicle 10. Thus, the moving object 60*a* on the front side of the vehicle 10 can be prevented from getting close to the person 50 (see FIG. 9) walking behind the vehicle 10 to cross the road 80, for example.

In the embodiment described above, when there is a person 50 on the rear side of the vehicle 10, and there is a moving object 60*a* on the front side of the vehicle 10, the controller 30 causes the display 21F of the front side display device 20F to display the warning. However, when there is a person 50 on the rear side of the vehicle 10, the controller 30 may cause the display 21F of the front side display device 20F to display the warning, irrespective of whether there is a moving object 60*a* on the front side of the vehicle 10. Namely, the controller 30 may control the warning on the display 21F of the front side display device 20F, based only on the information from the rear side detection device 14B (the rear side person detection device 15B), without receiving the information from the front side detection device 14F (the front side moving object detection device 16F).

Figure 10:
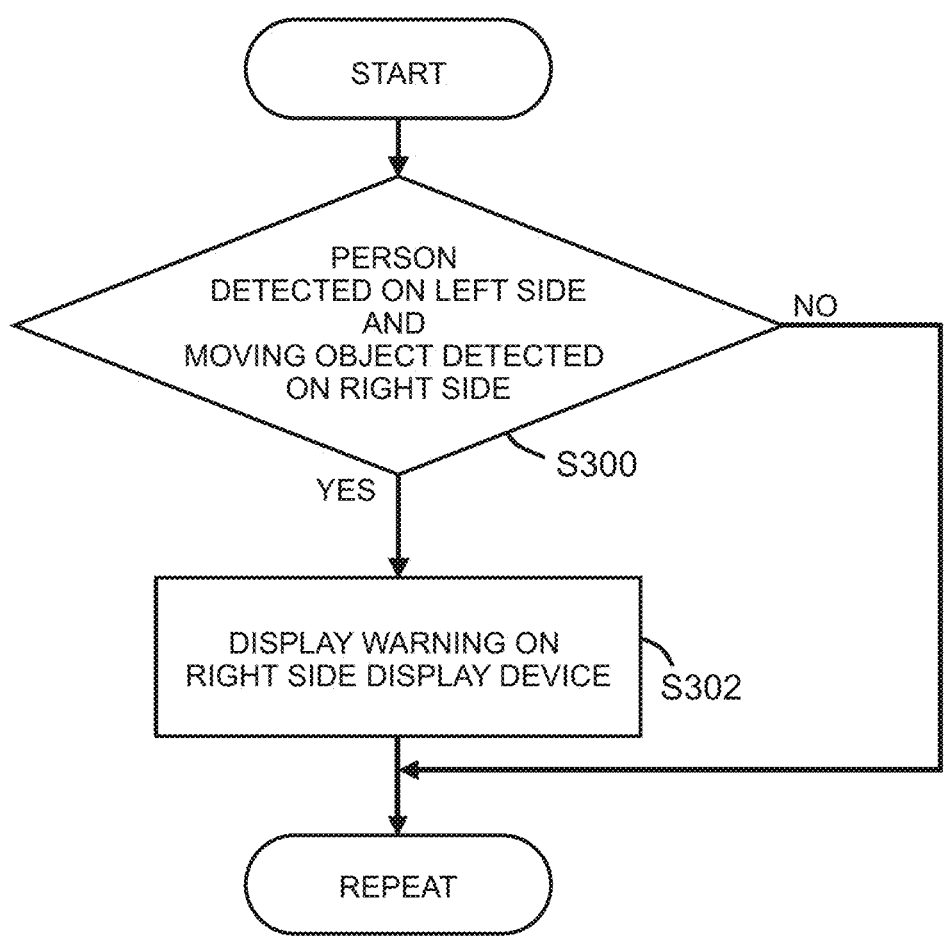
FIG. 10 is a flowchart showing control of a right side display device by the controller.
Figure 11:
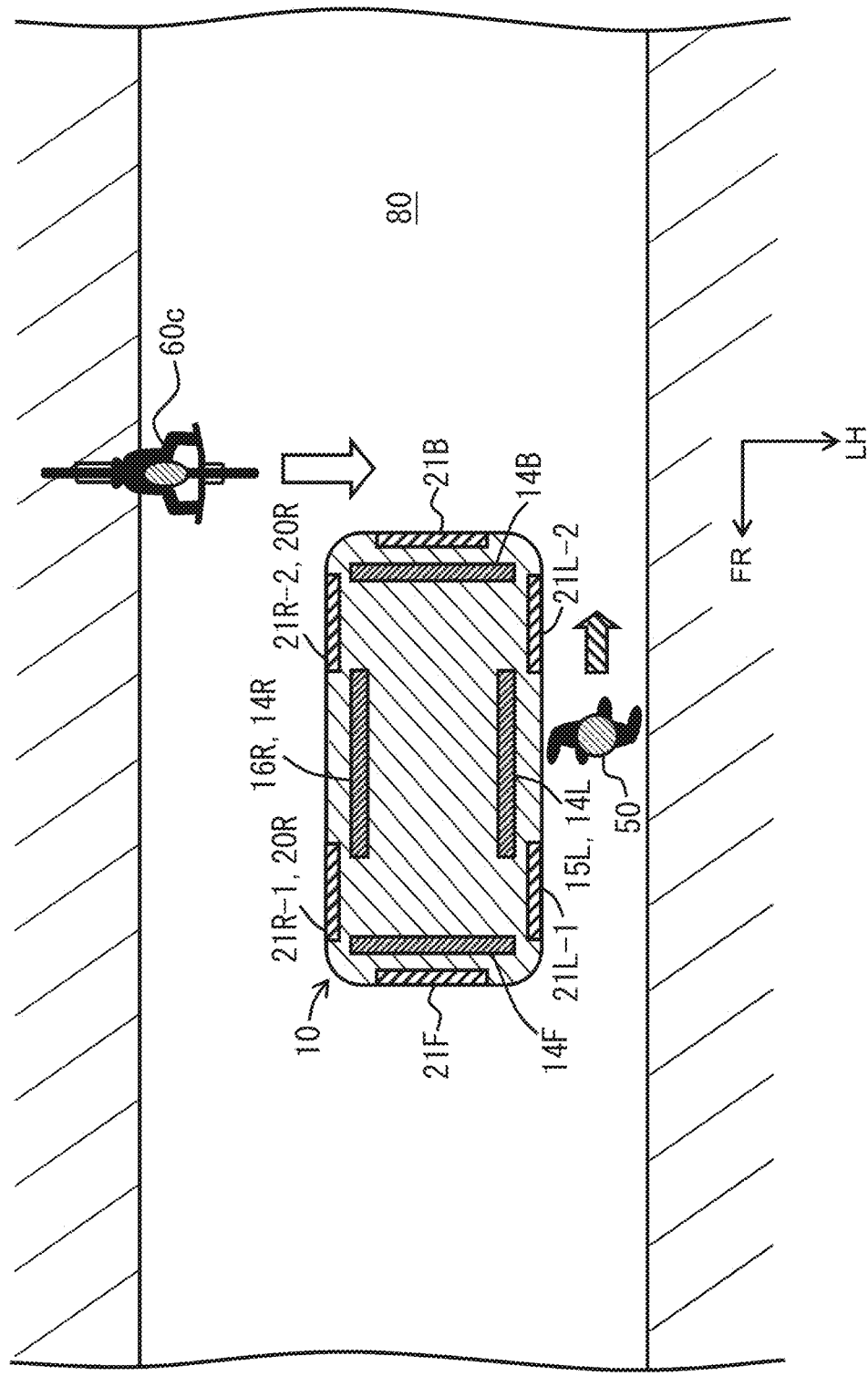
FIG. 11 is a view useful for describing a situation where warnings are displayed on displays of the right side display device.

Next, the control of the right side display device 20R will be described. FIG. 10 is a flowchart showing control of the right side display device 20R by the controller 30. FIG. 11 is a view useful for describing a situation where a warning is displayed on the displays 21R-1, 21R-2 of the right side display device 20R. In FIG. 11, a state of the vehicle 10 as viewed from above is illustrated.

The controller 30 repeatedly executes a control routine of FIG. 10 in predetermined cycles. Initially, in step S300, the controller 30 receives information as to whether there is a person 50 on the left side of the vehicle 10 from the left side detection device 14L (the left side person detection device 15L), and receives information as to whether there is a moving object 60*c* on the right side of the vehicle 10 from the right side detection device 14R (the right side moving object detection device 16R). Then, the controller 30 proceeds to step S302 when there is a person 50 on the left side of the vehicle 10, and there is a moving object 60*c* on the right side of the vehicle 10 (step S300: YES). On the other hand, when there is no person 50 on the left side of the vehicle 10, or there is no moving object 60*c* on the right side of the vehicle 10 (step S300: NO), the controller 30 finishes this cycle of processing.

FIG. 11 shows a state where an affirmative decision (YES) is obtained in step S300 of FIG. 10. In FIG. 11, the vehicle 10 is stopped on the road 80, and there is a person 50 on the left side of the vehicle 10, while there is a bicycle 60*c* as a moving object on the right side of the vehicle 10.

In step S302 of FIG. 10, the controller 30 controls the right side display device 20R so that a warning indicating that there is a person 50 on the left side of the vehicle 10 is displayed on the displays 21R-1, 21R-2 of the right side display device 20R FIG. 4 shows a state where the warning is displayed on the displays 21R-1, 21R-2 of the right side display device 20R. Since the warning is displayed on the right side face of the vehicle 10, the moving object 60*c* on the right side of the vehicle 10 can recognize that there is a person 50 on the left side of the vehicle 10. Thus, the moving object 60c on the right side of the vehicle 10 can be prevented from getting close to the person 50 (see FIG. 11) walking on the left side of the vehicle 10, for example.

In the embodiment described above, the controller 30 causes the displays 21R-1, 21R-2 of the right side display device 20R to display the warning when there is a person 50 on the left side of the vehicle 10 and there is a moving object 60c on the right side of the vehicle 10. However, when there is a person 50 on the left side of the vehicle 10, the controller 30 may cause the displays 21R-1, 21R-2 of the right side display device 20R to display the warning, irrespective of whether there is a moving object 60c on the right side of the vehicle 10. Namely, the controller 30 may control the warning on the displays 21R-1, 21R-2 of the right side display device 20R, based only on the information from the left side detection device 14L (the left side person detection device 15L), without receiving the information from the right side detection device 14R (the right side moving object detection device 16R).

Figure 12:
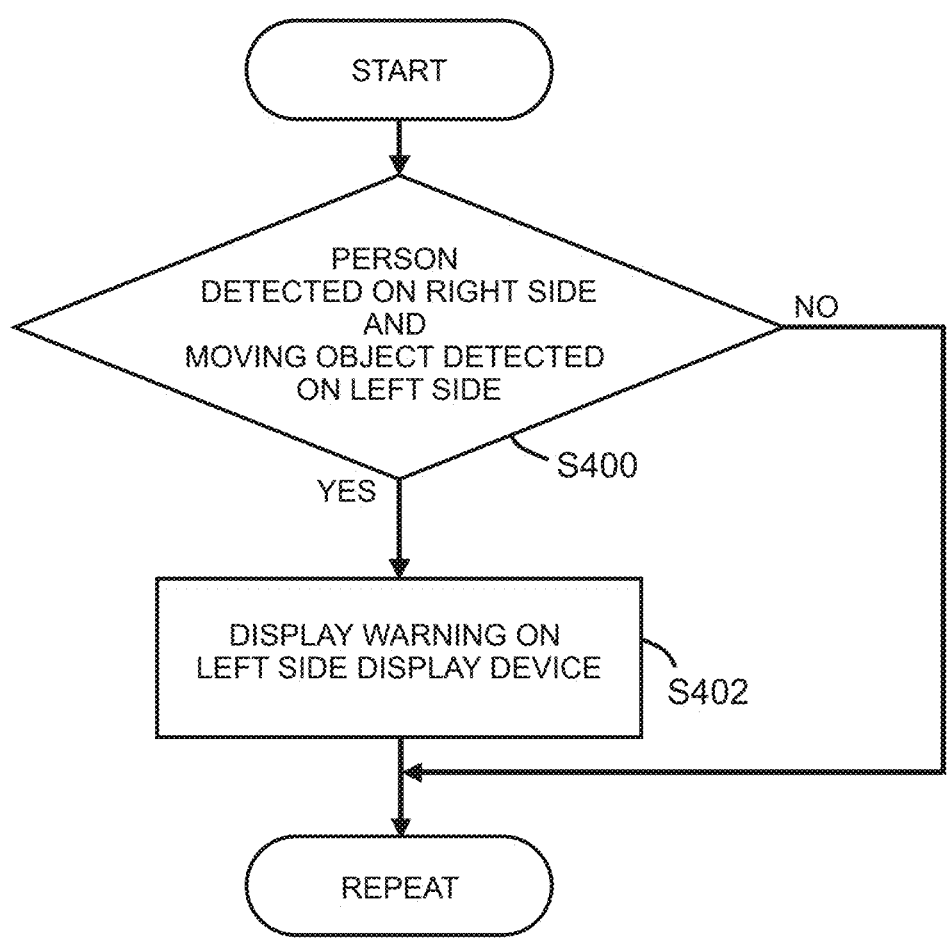
FIG. 12 is a flowchart showing control of a left side display device by the controller.

Next, the control of the left side display device 20L will be described. FIG. 12 is a flowchart showing control of the left side display device 20L by the controller 30. FIG. 13 is a view useful for describing a situation where a warning is displayed on the displays 21L-1, 21L-2 of the left side display device 20L. In FIG. 13, a state of the vehicle 10 as viewed from above is illustrated.

The controller 30 repeatedly executes a control routine of FIG. 12 in predetermined cycles. Initially, in step S400, the controller 30 receives information as to whether there is a person 50 on the right side of the vehicle 10, from the right side detection device 14R (the right side person detection device 15R), and receives information as to whether there is a moving object 60c on the left side of the vehicle 10, from the left side detection device 14L (the left side moving object detection device 16L). Then, the controller 30 proceeds to step S402 when there is a person 50 on the right side of the vehicle 10, and there is a moving object 60c on the left side of the vehicle 10 (S400: YES). On the other hand, when there is no person 50 on the right side of the vehicle 10, or there is no moving object 60c on the left side of the vehicle 10 (S400: NO), the controller 30 finishes this cycle of processing.

FIG. 13 shows a condition where an affirmative decision (YES) is obtained in step S400 of FIG. 12. In FIG. 13, the vehicle 10 is stopped on the road 80, and there is a person 50 on the right side of the vehicle 10, while there is a bicycle 60c as a moving object on the left side of the vehicle 10.

In step S402 of FIG. 12, the controller 30 controls the left side display device 20L so that a warning indicating that there is a person 50 on the right side of the vehicle 10 is displayed on the displays 21L-1, 21L-2 of the left side display device 20L. FIG. 2 shows a state where the warning is displayed on the displays 21L-1, 21L-2 of the left side display device 20L. Since the warning is displayed on the left side face of the vehicle 10, the moving object 60c on the left side of the vehicle 10 can recognize that there is a person 50 on the right side of the vehicle 10. Thus, the moving object 60c on the left side of the vehicle 10 can be prevented from getting close to the person 50 (see FIG. 13) walking on the right side of the vehicle 10, for example.

In the embodiment described above, when there is a person 50 on the right side of the vehicle 10, and there is a moving object 60c on the left side of the vehicle 10, the controller 30 causes the displays 21L-1, 21L-2 of the left side display device 20L to display the warning. However, when there is a person 50 on the right side of the vehicle 10, the controller 30 may cause the displays 21L-1, 21L-2 of the left side display device 20L to display the warning, irrespective of whether where is a moving object 60c on the left side of the vehicle 10. Namely, the controller 30 may control the warning on the displays 21L-1, 21L-2 of the left side display device 20L, based only on the information from the right side detection device 14R (the right side person detection device 15R), without receiving the information from the left side detection device 14L (the left side moving object detection device 16L).

While the vehicle 10 in the embodiment described above is a passenger bus, the vehicle 10 is not limited to this type of vehicle. The vehicle 10 may be a passenger car used by an individual, for example. The number and location of the detection devices 14F, 14B, 14L, 14R in the vehicle 10 can be changed as needed. Also, devices (such as sensors) provided for automatic driving of the vehicle 10 may be used as some or all of the detection devices 14F, 14B, 14L, 14R. The number and location of the displays of the display devices 20F, 20B, 20L, 20R in the vehicle 10 may also be changed as needed.

What is claimed is:

1. A display system of a vehicle, the display system comprising:
   a person detection device configured to detect a person on a first side of the vehicle in a top view of the vehicle;
   a moving object detection device configured to detect a moving object on a second side opposite to the first side of the vehicle;
   a display device provided on a vehicle exterior on the second side of the vehicle; and
   a controller configured to control the display device, wherein
   the controller is configured to, only in response to the moving object detection device detecting the moving object and the person detection device detecting the person, control the display device to display a warning indicating presence of the person, on a display of the display device,
   the vehicle is a bus, and
   the person detection device is located inside the vehicle rather than on the display device.

2. The display system according to claim 1, wherein:
   the person detection device is a front side person detection device configured to detect a person on a front side of the vehicle;
   the display device is a rear side display device provided on the vehicle exterior on a rear side of the vehicle; and
   the controller is configured to control the rear side display device to, only in response to the moving object detection device detecting the moving object and the front side person detection device detecting the person on the front side of the vehicle, display a warning indicating that there is a person on the front side of the vehicle, on a display of the rear side display device.

3. The display system according to claim 1, wherein:
   the person detection device is a rear side person detection device configured to detect a person on a rear side of the vehicle;
   the display device is a front side display device provided on the vehicle exterior on a front side of the vehicle; and
   the controller is configured to control the front side display device to, only in response to the moving object detection device detecting the moving object and the rear side person detection device detecting the person on the rear side of the vehicle, display a warning indicating that there is a person on the rear side of the vehicle, on a display of the front side display device.

4. The display system according to claim 1, wherein:
the person detection device is a left side person detection device configured to detect a person on a left side of the vehicle;
the display device is a right side display device provided on the vehicle exterior on a right side of the vehicle; and
the controller is configured to control the right side display device to, only in response to the moving object detection device detecting the moving object and the left side person detection device detecting the person on the left side of the vehicle, display a warning indicating that there is a person on the left side of the vehicle, on a display of the right side display device.

5. The display system according to claim 1, wherein:
the person detection device is a right side person detection device configured to detect a person on a right side of the vehicle;
the display device is a left side display device provided on the vehicle exterior on a left side of the vehicle; and
the controller is configured to control the left side display device to, only in response to the moving object detection device detecting the moving object and the right side person detection device detecting the person on the right side of the vehicle, display a warning indicating that there is a person on the right side of the vehicle, on a display of the left side display device.

6. The display system according to claim 1, wherein the moving object detection device is located inside the vehicle.

7. The display system according to claim 1, wherein the person detection device is located on an interior side of a windshield of the vehicle.

8. The display system according to claim 7, wherein the moving object detection device is located inside the vehicle and on an interior side of a rear glass of the vehicle.

* * * * *